United States Patent [19]

Taylor

[11] 4,342,394
[45] Aug. 3, 1982

[54] REMOVABLE PROTECTIVE COVER FOR A VIDEO DISC STYLUS CARTRIDGE

[75] Inventor: Byron K. Taylor, Carmel, Ind.

[73] Assignee: RCA Corporation, New York, N.Y.

[21] Appl. No.: 190,273

[22] Filed: Sep. 24, 1980

[30] Foreign Application Priority Data

Aug. 13, 1980 [GB] United Kingdom ................ 8026335

[51] Int. Cl.³ ........................ G11B 3/10; B65D 81/02; B65D 85/30
[52] U.S. Cl. .................................. 206/521; 206/592; 369/170
[58] Field of Search ................ 369/170; 206/521, 592

[56] References Cited

U.S. PATENT DOCUMENTS

| | | | |
|---|---|---|---|
| 3,289,829 | 12/1966 | Donahue | 206/592 |
| 3,381,873 | 5/1968 | Hirota | 206/592 |
| 3,572,574 | 3/1971 | Mears | 206/521 |
| 3,910,411 | 10/1975 | Deeter | 206/592 |
| 3,986,610 | 10/1976 | Hawn | 206/592 |
| 4,019,672 | 4/1977 | Giannini | 206/592 |
| 4,256,311 | 3/1981 | Allen et al. | 369/170 |

Primary Examiner—Steven L. Stephan
Attorney, Agent, or Firm—E. M. Whitacre; J. S. Tripoli

[57] ABSTRACT

A protective cover is provided for a video disc record playback cartridge. The cartridge includes a flylead which normally has a bow shape which is directly related to the forces applied to the playback stylus. The protective cover has a housing which slides onto the cartridge body and also has an element inside of the housing which prevents the bow shape of the flyhead from being disturbed during shipping and handling of the cartridge to avoid adverse changes to the preset forces applied to the stylus.

9 Claims, 3 Drawing Figures

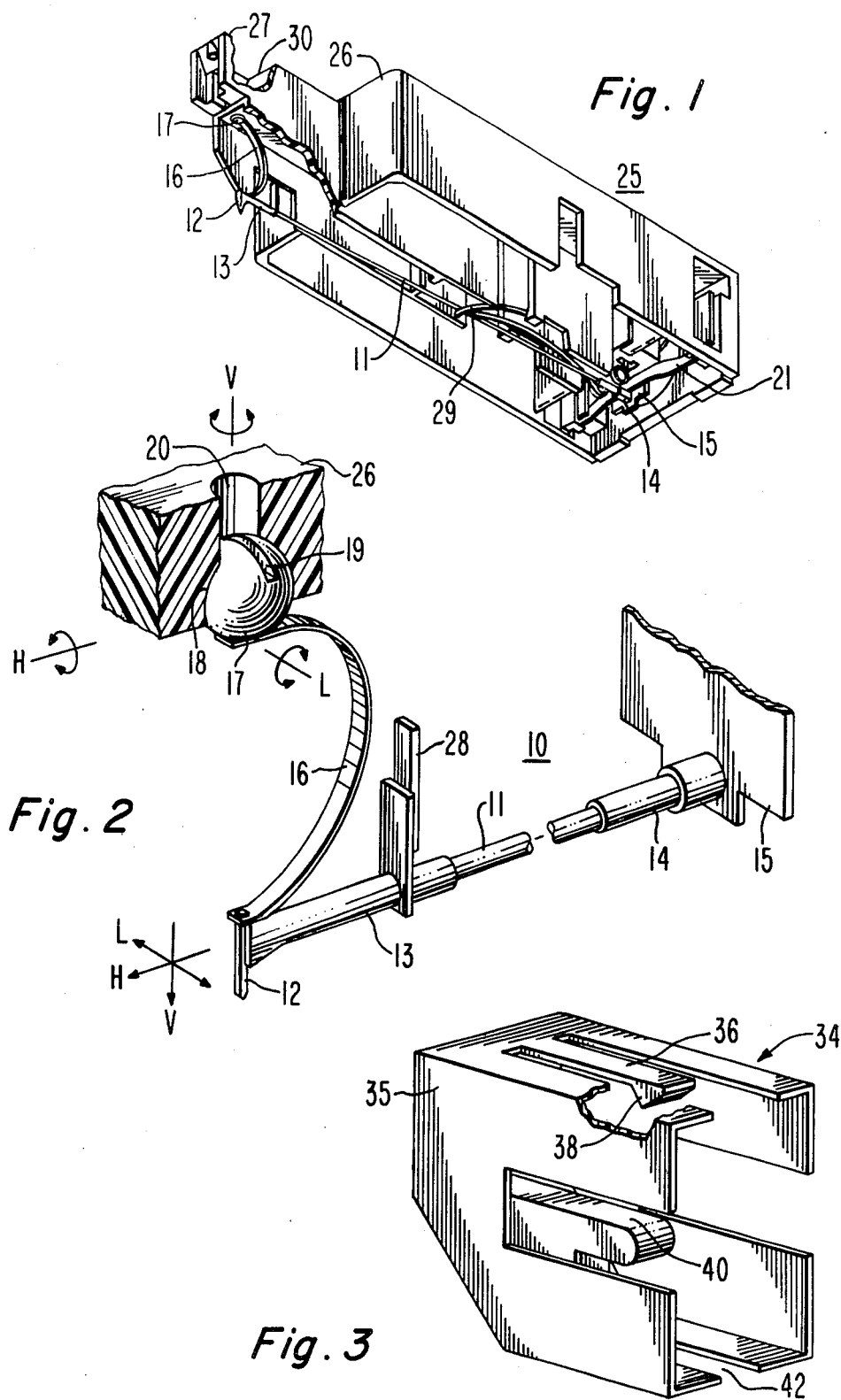

REMOVABLE PROTECTIVE COVER FOR A VIDEO DISC STYLUS CARTRIDGE

The present invention relates generally to certain video disc cartridges and more particularly to a protective cover for this type of cartridge.

Video disc playback systems comprise apparatus for recovering prerecorded information from disc records. The density of information on such discs is extremely high. To achieve the high information density the information is recorded in spiral or concentric tracks having a density which may be as high as 10,000 tracks per inch.

Where the tracks are formed as a spiral groove, a concomitant result is that the groove depth is often very shallow. The shallow groove cannot be dependably relied upon to pull the weight of a signal pickup stylus assembly across the entire recorded surface of the disc record. Therefore the stylus assembly is compliantly mounted in a carriage mechanism which translates the stylus assembly radially across the disc in proper time relationship with the recovered signal. The stylus assembly is sometimes contained in a cartridge, which cartridge is removable from the carriage mechanism for replacement purposes.

Integral to the carriage mechanism in some systems are several sensor and transducer elements which cooperate with the stylus arm. The sensor elements may be part of a servo system for controlling the rate at which the carriage mechanism translates radially across the disc. Since the stylus assembly is compliantly mounted to the carriage mechanism, the stylus may move radially across the disc relative to the carriage. The relative stylus-carriage movement is detected and used to control the carriage speed. The transducer elements, on the other hand, are magnetically coupled to the stylus arm to impart limited impulsive motion to the stylus for the production of special effects such as stop motion for example. Due to the extremely close spacing of the information tracks on the disc record and due to the signal pickup stylus cartridges being interchangeable, it can readily be appreciated that reliable performance of the player mechanism depends upon proper alignment of each stylus assembly within its respective cartridge.

Certain video disc systems utilize cartridges wherein a thin, flat, elongated conductive leaf spring member or flylead is used to provide an electrical connection between a pickup stylus electrode and another electrode coupled to pickup circuitry and also to provide proper vertical forces and side bias forces on the stylus relative to the record. That is, the conductive flylead also functions as a spring member to apply tracking forces to the stylus and to set up the initial proper lateral alignment of the stylus assembly.

Typically, the vertical or tracking force as well as the side bias forces are set at the factory during cartridge assembly. The spring-like flylead is set into a "C" or bow shape during assembly and adjustments are made at the top of the bow to set the vertical tracking force. Similarly, the end of the flylead at the top of the bow is adjusted to set the side bias forces on the stylus. The tracking force is measured in tens of milligrams and the side bias forces are to be nominally zero mg plus or minus two or three mg.

These force settings, which are accomplished through adjustments to the bow-shaped flylead, are extremely important to overall player performance. If the tracking pressure is not within acceptable limits, the stylus will not reliably follow the information track and therefore the carriage servo system will not function smoothly and reliably. If the side bias forces are out of acceptable limits, the previously mentioned transducer elements will not move the stylus in the desired manner, i.e., groove skipping will be unpredictable. Thus, the stylus assembly alignment and force settings, which are all related to the bow-shaped flylead, are critical to the proper performance of the entire system.

In cartridges of the type under consideration, a spring mechanism is used to hold the stylus arm assembly within the confines of the cartridge whenever the cartridge is not in the player carriage. In the out-of-carriage condition, the flylead is still in a bow-like shape. It has been discovered that under certain severe shock conditions, typically while out of the carriage and, occurring during shipping or handling, the bow-shaped flylead may become inverted. That is, the bow or "C" shape of the flylead between the stylus electrode and pickup circuit electrode may take the form of a somewhat "S" shape between the two ends of the flylead as a result of severe mechanical shock conditions. Even though the thin flexible spring-like flylead can be manually pushed back into the desired "C" shape, it turns out that the critical vertical and side bias forces very often will fall outside of the acceptable factory set limits as a result of overstressed conditions. In such cases, the entire video disc system, as far as the consumer is concerned, becomes inoperative or, at the very least, unacceptable.

Thus it becomes very desirable to provide a means whereby it is nearly impossible for the flylead to change its desired shape under the most severe mechanical shock anticipated.

In accordance with the present invention, a protective cover is provided for use with a playback cartridge assembly. The cartridge assembly comprises a cartridge body having an elongated section, a stylus arm compliantly mounted in the body, a pickup stylus mounted on the arm, and an elongated spring-like flylead member connected between the stylus and the cartridge body, the flylead normally has a bow shape. The protective cover comprises a housing adapted to slide over a portion of the cartridge body and a means within the protective cover housing for preventing the disturbance of the bow-like shape of the flylead when the cover is attached to the cartridge body.

In the drawing:

FIG. 1 is a perspective drawing of one type of video disc signal pickup cartridge;

FIG. 2 is a perspective drawing of the signal pickup stylus-stylus arm assembly mounted within the FIG. 1 cartridge; and FIG. 3 is a perspective drawing of a protective cover in accordance with the present invention to work with a cartridge of the type shown in FIG. 1.

Referring to FIGS. 1 and 2, the cartridge 25 includes an enclosure or body 26 for supporting and protecting the relatively fragile signal pickup stylus arm assembly 10. The body 26 is a rigid non-deformable material having an elongated front section 27. Mounted in the body 26 is a signal pickup stylus 12 (with an electrode on one face thereof) secured to a stylus holder 13 which in turn is attached to a first end of the stylus arm 11. The other end of the stylus arm is attached to a plate 15 by a compliant coupler 14 which allows the stylus arm to have relatively free pivotal movement about the connection to plate 15 at least over a limited range of motion. The plate 15 is secured to body 26 by the elastic diaphragm 21 which permits limited longitudinal motion of the stylus arm.

A thin, flat, elongated leaf spring or flylead 16 (usually conductive) has a first end attached to the stylus 12 or stylus holder 13 and a second end secured to the cartridge body 26 by an adjusting member 17 rotatably secured in the body 26. Adjusting member 17 may be spherically shaped and constrained within a generally close fitting spherical cavity 18 within a portion of the body material 26. The fit between the member 17 and cavity 18 is sufficiently tight that normal motion of the flylead during playback operations will not cause rotation therebetween but sufficiently loose to permit desired rotation of the member by introduction of a tool into the depression 19 and either rotating the tool about the generally vertical axis "V" and/or rocking the tool within the hole 20 provided in the enclosure 26. Alternatively member 17 may be cylindrically shaped in a cylindrical cavity 18 with adjustment accomplished by rotating the cylinder about the lateral axis, "L", and/or sliding the cylinder within the cavity 18 along the lateral axis.

The flylead leaf spring 16 serves to apply a predetermined pressure between the stylus and the disc record during record playback, and provides electrical connection between the signal pickup stylus electrode and member 17 which serves as an electrode which is coupled to video processing circuitry (not shown). The flylead may also be used as one electrode of a position sensitive capacitor for determining the relative position of the stylus with respect to the sidewalls of the cartridge or the carriage. For the latter application, one electrode of an air dielectric variable capacitance is fixed to the carriage, the other capacitor electrode is fixed to the stylus arm. As the arm moves laterally (the direction designated "L" in the drawing) the change in capacitance is detected to indicate the relative change in stylus carriage position.

The item 28 attached to the stylus holder is a magnet which cooperates with electromagnets secured to the carriage to selectively impart lateral motion to the stylus end of the stylus arm.

The flylead 16 is sufficiently compliant to permit the stylus to have relatively free lateral motion and to enable it to track an eccentric groove. Though compliant, the flylead is sufficiently stiff to position the stylus in space laterally, when no lateral forces are applied to the stylus. This lateral positioning is accomplished by orienting the member 17, e.g., to effect a limited rightward lateral stylus position change, the member 17 is rotated clockwise about the vertical axis. Similarly the stylus disc pressure may be altered by effecting a change in the flylead arc deformation by rotating member 17 about the lateral axis. Adjustments are made, during factory assembly operations, on member 17 to achieve the desired vertical tracking pressure and the side bias force as described above.

Also shown in FIG. 1 is a spring member 29 which is arranged to hold the stylus assembly 10 within the body 26 when the cartridge 25 is out of the player carriage. When the lid on the player carriage cartridge compartment is closed, a member attached to the lid enters the cartridge body 26 to defeat the spring 29 and the stylus arm is permitted to rest on an arm lifting/lowering mechanism.

Turning to FIG. 3, a protective cover 34 is shown. Protective cover 34 is typically made from a plastic material such as polypropylene and is molded such that the cover 34 will slide over the elongated section 27 of the cartridge body 26 after all factory adjustments and settings have been made. The cover 34 is a substantially hollow housing 35 and this housing is shaped overall to match the shape of the elongated section 27.

On the top surface of cover 34 there is an integrally molded latching finger 36 having a ramped protrusion 38 at the far end, as shown. When the cover 34 is slid over the elongated section 27, the protrusion 38 rides up a wall 30 molded in the elongated section 27 and upon the further sliding of the cover 34 onto section 27 the spring forces developed in finger 36 cause protrusion 38 to snap down behind wall 30 thereby locking the cover 34 to the elongated section 27 of cartridge body 26. Protrusion 38 has an opposing ramp such that when it is desired to place the cartridge in a video disc player carriage, the cover 34 may be easily removed by the player operator when the opposing ramp rides up the wall 30 under a small manual pull force. The locking mechanism provides a means for preventing the cover from inadvertently slipping off during shipping or handling.

The protective cover is also provided with a protuberance 40 which is also integrally molded within the housing 35. Protuberance 40 extends from the back wall of housing 35 such that when the cover is in place the end of protuberance 40 is close to the bow-shaped flylead but, no part of member 40 actually contacts flylead 16, member 17, stylus 12 or the connection point of the flylead to the stylus. The lateral dimension of protuberance 40 is desirably greater than the corresponding dimension of the flylead 16. In this way protuberance 40 is effective to prevent flylead 16 from having its bowed shape disturbed due to severe shock while not impacting the delicate members mentioned under normal conditions.

The protective cover 34 also is provided with a bottom wall of housing 35 having a cutout portion or hole 42 therein. The opening 42 is arranged such that it is directly underneath the stylus 12 when the cover 34 is locked in place on the cartridge 25. The stylus 12 is very delicate and in the event of vertical shock being applied to the cartridge it is preferred to have the stylus protrude through the opening 42 under the influence of vertical forces as opposed to hitting a solid wall. Thus, the opening 42 is helpful in preventing stylus tip damage under the conditions mentioned.

What is claimed is:

1. A protective cover for a record playback cartridge assembly, said cartridge assembly comprising: a cartridge body; a stylus arm mounted within said body; a pickup stylus mounted on one end of said arm; and an elongated flylead member connected between said cartridge body and a certain point in the vicinity of said stylus, said flylead normally assuming a bow-like shape, said cartridge assembly being inserted into a player for record playback, said protective cover comprising:

a housing adapted to slide over at least a portion of said cartridge body when said cartridge assembly is out of said player; and means located within said housing and normally not touching said flylead for preventing the inversion of said bow-like shape of said flylead;

said protective cover being removed when said cartridge assembly is inserted into said player for record playback.

2. The protective cover according to claim 1 further comprising a locking member on said housing adapted for coupling to an element of said cartridge body for locking said protective cover to said cartridge body.

3. The protective cover according to claim 2 wherein said housing includes a surface having an opening adjacent to said stylus when said cover is locked to said cartridge body.

4. The protective cover according to claim 3 wherein said housing is formed from a plastic material and wherein said locking member comprises a latching finger integrally molded on said housing, said finger having a protrusion adapted to engage said element of said cartridge body.

5. A protective cover for a record playback cartridge assembly, said cartridge assembly comprising: a cartridge body, having an elongated section; a stylus arm compliantly mounted at one end within said body; a pickup stylus including a conductive electrode mounted at the other end of said arm in the area of said elongated section; and an elongated conductive spring-like flylead member electrically connected at one end to said stylus electrode and electrically connected at the other end thereof to an electrode located on said elongated section, said flylead normally assuming a bow-like shape between said two electrodes with the bow extending toward said other end of said stylus arm, said cartridge assembly being inserted into a llayer for record playback, said protective cover comprising:

a housing adapted to slide over and substantially enclose said elongated section when said cartridge assembly is not inserted into said player for record playback; and a protuberance within said housing adapted to extend toward said other end of said arm in the vicinity of said bow of said flylead and normally not touching said flylead when said housing is attached to said elongated section such that inversion of said bow-like shape of said flylead is prevented;

said protective cover being removed when said cartridge assembly is inserted into said player for record playback.

6. The protective cover according to claim 5 further comprising a locking member on said housing adapted for coupling to an element of said cartridge body for locking said protective cover to said cartridge body.

7. The protective cover according to claim 6 wherein said housing includes a surface havng an opening adjacent to said stylus when said cover is attached to said elongated section such that said stylus is permitted to travel through said opening.

8. The protective cover according to claim 7 wherein said housing is formed from a plastic material and wherein said locking member comprises a latching finger integrally molded on said housing, said finger having a protrusion adapted to engage said element of said cartridge body.

9. Apparatus for use with a record playback cartridge assembly of the type comprising: a cartridge body; a stylus arm mounted on one end of said arm; and an elongated flylead member connected between said cartridge body and a certain point in the vicinity of said stylus, said flylead normally assuming a bow-like shape, said apparatus comprising:

means positioned in the vicinity of said flylead but not normally touching said flylead for preventing the inversion of said bow-like shape of said flylead.

* * * * *